(12) United States Patent
Tripathi et al.

(10) Patent No.: US 7,684,423 B2
(45) Date of Patent: Mar. 23, 2010

(54) SYSTEM AND METHOD FOR VIRTUAL NETWORK INTERFACE CARDS BASED ON INTERNET PROTOCOL ADDRESSES

(75) Inventors: Sunay Tripathi, San Jose, CA (US); Nicolas G. Droux, Rio Rancho, NM (US); Kais Belgaied, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 761 days.

(21) Appl. No.: 11/479,997

(22) Filed: Jun. 30, 2006

(65) Prior Publication Data

US 2008/0002703 A1 Jan. 3, 2008

(51) Int. Cl.
*H04L 12/56* (2006.01)

(52) U.S. Cl. .................................. 370/412; 370/420

(58) Field of Classification Search ................ 370/412, 370/413, 414, 415, 416, 417, 418, 419, 420, 370/421
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner*—Jayanti K Patel
*Assistant Examiner*—Bo Hui A Zhu
(74) *Attorney, Agent, or Firm*—Osha • Liang LLP

(57) ABSTRACT

A system including a network interface card (NIC) associated with a Media Access Control (MAC) address and a host operatively connected to the NIC. The NIC includes a default hardware receive ring (HRR), a plurality of non-default HRRs, and a hardware classifier. The hardware classifier is configured to analyze an inbound packet using a destination Internet Protocol (IP) address and to send the inbound packet to one of the plurality of non-default HRRs if the inbound packet is a unicast packet, and to send the packet to the default HRR if the inbound packet is an inbound multi-recipient packet. The host includes a plurality of virtual NICs (VNICs) and an inbound software classifier, that includes a plurality of software receive rings (SRRs) and is configured to obtain inbound packets from the default HRR, and to determine to which of the plurality of SRRs to send a copy of the packet.

12 Claims, 7 Drawing Sheets

U.S. PATENT DOCUMENTS

| | | |
|---|---|---|
| 2002/0052972 A1 | 5/2002 | Yim |
| 2003/0037154 A1 | 2/2003 | Poggio et al. |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0174324 A1 | 8/2006 | Zur et al. |

OTHER PUBLICATIONS

Dovrolis, C., Thayer, B. and Ramanathan, P: "HIP: Hybrid Interrupt—Polling for the Network Interface", ACM SIGOPS Operating Systems Review, vol. 35, Iss. 4, Oct. 2001, (11 Pages).

ions filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228 .

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790 .

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,997; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a receive data structure (e.g., a receive ring on the NIC) and an interrupt is issued to the CPU associated with the queue. In response to the interrupt, a thread associated with the CPU (to which the serialization queue is bound) retrieves the packets from the receive data structure and places the packets in the appropriate queue. Once packets are placed in the queue, those packets are processed in due course. In some implementations, the queues are implemented such that only one thread is allowed to access a given queue at any given time.

SUMMARY

In general, in one aspect, the invention relates to a system including a network interface card (NIC) associated with a Media Access Control (MAC) address and a host operatively connected to the NIC. The NIC includes a default hardware receive ring (HRR), a plurality of non-default HRRs, and a hardware classifier. The hardware classifier is configured to analyze an inbound packet received by the NIC using a destination Internet Protocol (IP) address of the inbound packet, to determine, based on the analysis of the destination IP address of the inbound packet, whether the inbound packet is a unicast packet or a multi-recipient packet, to send the inbound packet to one of the plurality of non-default HRRs if the inbound packet is a unicast packet, and to send the packet to the default HRR if the inbound packet is an inbound multi-recipient packet. The host includes a plurality of virtual NICs (VNICs) and an inbound software classifier. Each of the plurality of VNICs is associated with a unique IP address and the MAC address. Each of the plurality of VNICs is also associated with one of the plurality of non-default HRRs. The inbound software classifier includes a plurality of software receive rings (SRRs), wherein each of the plurality of SRRs is associated with one of the plurality of VNICs. The inbound software classifier is configured to obtain inbound packets from the default HRR, and to determine to which of the plurality of SRRs to send a copy of the packet.

In general, in one aspect, the invention relates to a system including a plurality of virtual network interface cards (VNICs), wherein each of the plurality of VNICs is associated with a unique Internet Protocol (IP) address and a common Media Access Control (MAC) address. The system also includes a plurality of packet destinations, wherein each of the plurality of packet destinations is associated with one of the plurality of VNICs, a plurality of receive rings (RRs), wherein each of the plurality of RRs is associated with one of the plurality of VNICs, and an inbound classifier, operatively connected to the plurality of RR. The inbound classifier is configured to receive an inbound packet, analyze the inbound packet using a destination IP address of the inbound packet, and to determine, based on the analysis of the destination IP address of the inbound packet, whether the inbound packet is a unicast packet or a multi-recipient packet. The inbound classifier is also configured to send the inbound packet to the one of the plurality of RRs if the inbound packet is a unicast packet, wherein the one of the plurality of RRs is associated with the one of the plurality VNICs and wherein the destination IP address is the unique IP address of the one of the plurality of VNICs.

In general, in one aspect, the invention relates to a method for processing packets. The method includes receiving an inbound packet, analyzing the inbound packet using a destination Internet Protocol (IP) address of the inbound packet, and determining, based on the analysis of the destination IP address of the inbound packet, whether the inbound packet is a unicast packet or a multi-recipient packet. The method further includes sending the inbound packet to the one of a plurality of receive rings (RRs) if the inbound packet is a unicast packet, wherein the one of the plurality of RRs is associated with one of a plurality VNICs and wherein the one of the plurality of VNICs is associated with an IP address corresponding to the destination IP address, wherein each of the plurality of VNICs is associated with a unique IP address and a common Media Access Control (MAC) address.

Other aspects and advantages of the invention will be apparent from the following description and the appended claims.

DETAILED DESCRIPTION

Figure 1:
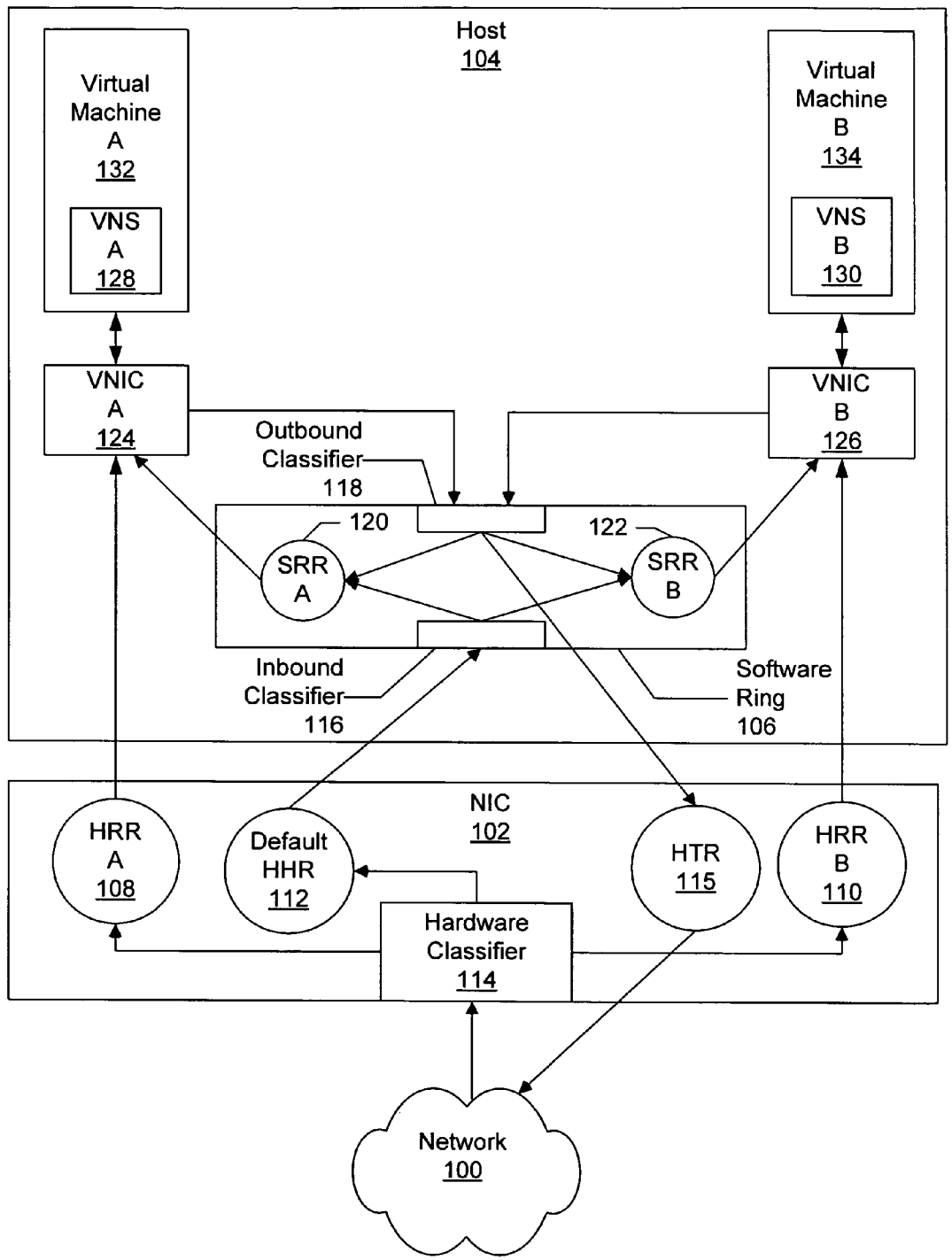
FIGS. 1, 5 and 6 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide methods and systems for creating and using a virtual network interface card (VNIC) based on the unique Internet Protocol (IP) address of a virtual machine. More specifically, embodiments of the invention allow the creation of VNICs based on the IP addresses of virtual machines to which the VNICs are bound, rather than on unique or randomly selected MAC addresses.

FIG. 1 shows a system in accordance with one embodiment of the invention. The system includes a host (104) operatively connected to a NIC (102). The NIC (102) provides an interface between the host (104) and a network (100) (e.g., a local area network, a wide area network, a wireless network, etc.). More specifically, the NIC (102) includes a network interface (NI) (i.e., the hardware on the NIC used to interface with the network) (not shown) that receives packets from the network (100) and transmits packets from the host (104) to the network (100). The NI may correspond to an RJ-45 connector, a wireless antenna, etc. The packets received by the NI from the network (100) are sent to other components on the NIC (102) for processing.

In one embodiment of the invention, the NIC (102) includes a hardware classifier (114), one or more hardware receive rings (108, 110, 112) (of which at least one is designated as a default hardware receive ring (112)), and a hardware transmit ring (115). In one embodiment of the invention, the hardware receive rings (108, 110, 112) and the hardware transmit ring (115) correspond to portions of memory within the NIC (102) and are used to temporarily store received packets and packets to be transmitted, respectively. In one embodiment of the invention, the default hardware receive ring (112) and the hardware transmit ring (115) are operatively connected to a software ring (106). The other hardware receive rings (108, 110) are each operatively connected to a VNIC (124, 126) associated with a unique IP address.

In one embodiment of the invention, the hardware classifier (114) is configured to analyze the incoming network traffic, typically in the form of packets, received from the network (100). As is explained in detail below, in one embodiment of the invention, analyzing individual packets includes using the destination IP addresses of the packets to determine to which of the hardware receive rings (108, 110, 112) each packet is sent. In one embodiment of the invention, each multi-recipient packet, i.e., a broadcast or multicast packet, received by the NIC (102) is sent to the default hardware receive ring (112). One of ordinary skill will appreciate that when IP is used to transmit packets, certain IP addresses are used by convention to designate broadcast and multicast packets. Each unicast packet is sent to the hardware receive ring (108, 110) operatively connected to the VNIC (124, 126) associated with the destination IP address of the unicast packet. The hardware classifier (114) may be implemented entirely in hardware (i.e., the hardware classifier (114) may be a separate microprocessor embedded on the NIC (102)). Alternatively, the hardware classifier (114) may be implemented in software stored in memory (e.g., firmware, etc.) on the NIC (102) and executed by a microprocessor on the NIC (102).

In one embodiment of the invention, the host (104) may include the following components: a device driver (not shown), a software ring (106) (i.e., a software classifier), one or more VNICs (124, 126), and one or more virtual machines (132, 134) including one or more virtual network stacks (128, 130). In one embodiment of the invention, the device driver (not shown) provides an interface between the hardware receive rings (108, 110, 112) and the host (104). More specifically, the device driver (not shown) exposes the hardware receive rings (108, 110, 112) and the hardware transmit ring (115) to the host (104).

In one embodiment of the invention, the software ring (106) is operatively connected to the default hardware receive ring (112), the hardware transmit ring (115), and the VNICs (124, 126). The software ring (106) includes functionality to analyze both multi-recipient packets received from the network (100) and multi-recipient packets to be transmitted on the network (100) to determine whether those packets should be received by one or more packet destinations on the host (104).

The software ring (106) includes software receive rings (120, 122), an inbound classifier (116), and an outbound classifier (118). The software receive rings (120, 122) are configured to temporarily store packets in memory, similar to the hardware receive rings (108, 110, 112). Each of the software receive rings (120, 122) is associated with a VNIC (124, 126).

The inbound classifier (116) is configured to analyze multi-recipient packets in the default hardware receive ring (112) to determine whether the multi-recipient packets are to be sent to one or more of the software receive rings (120, 122). The inbound classifier (116) is configured to determine whether a received multi-recipient packet is a broadcast packet or a multicast packet by analyzing the IP destination address of the packet. If the multi-recipient packet is a broadcast packet, the inbound classifier (116) is configured to place a copy of the broadcast packet in each software receive ring (120, 122). If the multi-recipient packet is a multicast packet, the inbound classifier (116) is configured to place a copy of the multicast packet in each software receive ring (120, 122) associated with a VNIC, which is associated with an IP address that is a member of the addressed multicast group (i.e., the multicast group identify by the IP address (or portion thereof)).

The outbound classifier (118) is configured to analyze outbound packets as these outbound packets leave the VNICs (124, 126) to determine whether any of the outbound packets are multi-recipient packets that should be transmitted to IP addresses on the host (104). The outbound classifier (118) is configured to determine whether an outbound packet is a unicast packet or a multi-recipient packet by analyzing the IP destination address of the packet. If the outbound packet is a unicast packet, the outbound classifier (118) is configured to send the packet to the hardware transmit ring (115). If outbound packet is a multi-recipient packet, the outbound classifier (118) is configured to determine whether the multi-recipient packet is a broadcast packet or a multicast packet. If the outbound packet is a broadcast packet, the outbound classifier (118) is configured to place a copy of the broadcast packet in each software receive ring (120, 122). If the outbound packet is a multicast packet, the outbound classifier (118) is configured to place a copy of the multicast packet in each software receive ring (120, 122) associated with a VNIC (124, 126) associated with an IP address that is a member of the addressed multicast group. The outbound classifier (118) is further configured to send, as necessary, the multi-recipient packets to the hardware transmit ring (115).

In one embodiment of the invention, the VNICs (124, 126) provide an abstraction layer between the NIC (102) and the various packet destinations (not shown) executing on the virtual machines (132, 134) of the host (104). More specifically, each VNIC (124, 126) operates like a NIC (102). Thus, while the host (104) may be operatively connected to a single NIC (102), the virtual machines (132, 134) of the host (104) operate as if the host (104) is bound to multiple NICs.

In one embodiment of the invention, each of the VNICs (124, 126) is associated with a virtual machine (132, 134) including one or more virtual network stacks (128, 130). Each of the VNICs (124, 126) is associated with a unique IP address of the virtual machine (128, 130) to which the VNIC (124, 126) is operatively connected. That is, a VNIC (124, 126) is created for each IP address of a virtual machine (132, 134). All received packets having an IP address of the virtual machine as well as broadcast packets or multicast packets directed to a multicast group including the IP address pass through the VNIC (124, 126) associated with that IP address. In addition, all outbound packets from that IP address pass through the VNIC (124, 126) associated with that IP address.

In one embodiment of the invention, each virtual network stack (128, 130) includes network layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, each virtual network stack (128, 130) is configured to send and/or receive packets from one or more associated packet destinations (not shown) on the virtual machine (132, 134). Further, each virtual network stack (128, 130) is configured to send and/or receive packets from an associated VNIC (124, 126). In addition, each virtual network stack (128, 130) may include functionality, as needed, to perform additional processing on the incoming and outgoing packets. This additional processing may include, but is not limited to, cryptographic processing, firewall routing, etc.

In one embodiment of the invention, each virtual machine (132, 134) shares host resources (e.g., one or more central processing units (CPU), memory, etc.) (not shown) with other virtual machines (132, 134) on the host (104). As discussed above, a virtual machine (132, 134) on a host (104) may include one or more packet destinations (e.g., containers and/or services) (not shown). In one embodiment of the invention, the packet destination(s) (e.g., containers and/or services) corresponds to any process or group of processes executing on a virtual machine of the host that sends and receives network traffic. Examples of packet destinations include, but are not limited to containers, services (e.g., web server), etc.

Figure 2:
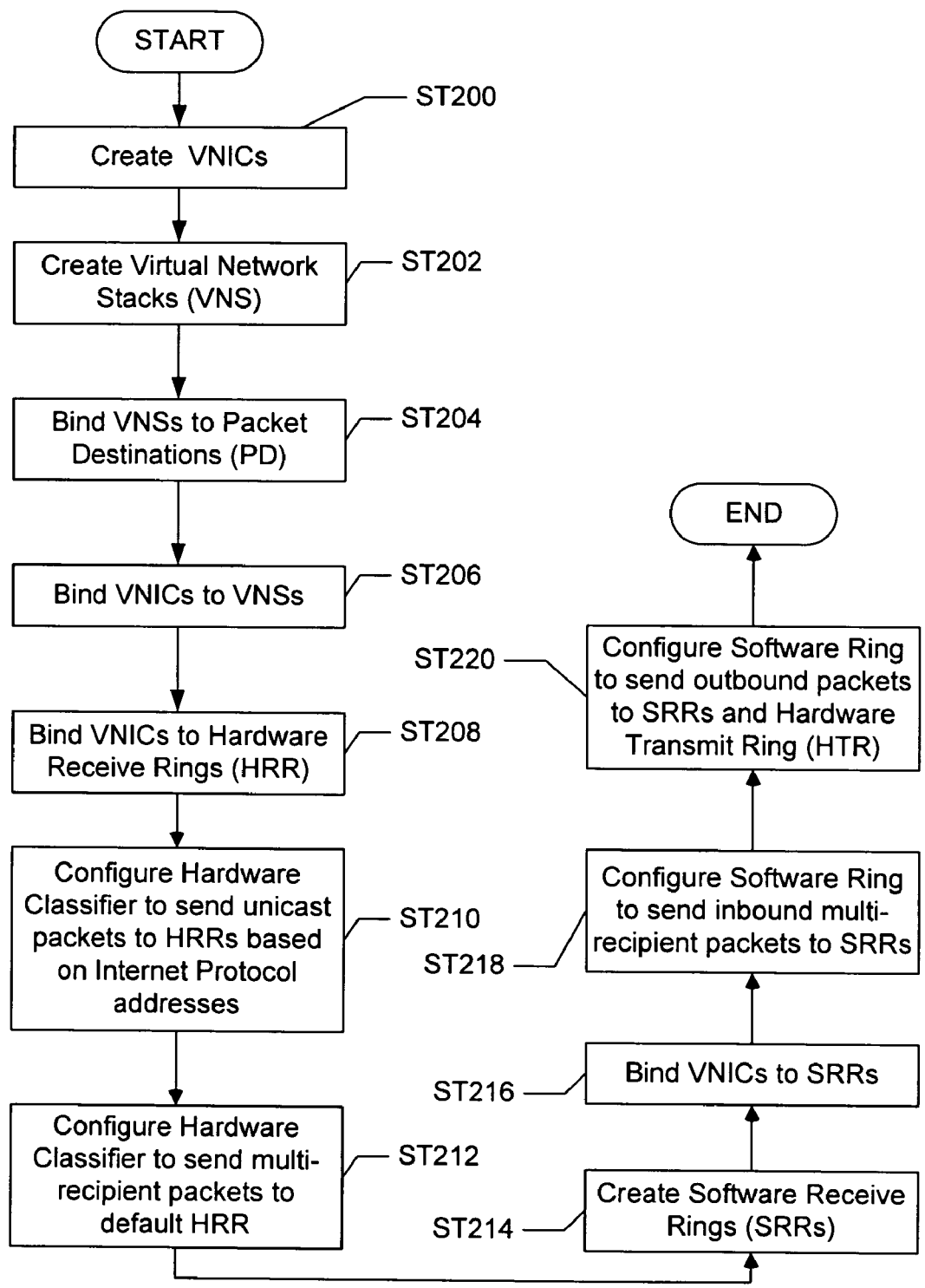
FIGS. 2-4 show flow diagrams in accordance with one or more embodiments of the invention.

FIG. 2 shows a flowchart of the initialization of the system of FIG. 1 in accordance with one or more embodiments of the invention. While the various steps in this flowchart are presented and described sequentially, one of ordinary skill will appreciate that some or all of the steps may be executed in different orders and some or all of the steps may be executed in parallel. As shown in FIG. 2, VNICs are created and associated with IP addresses of virtual machines on a host, where each created VNIC is associated with a unique IP address of associated with a virtual machine (ST200). Virtual network stacks are created (ST202) and bound to packet destinations executing on the virtual machines (ST204). The VNICs are each bound to a virtual network stack (ST206) and to a hardware receive ring (ST208).

A hardware classifier is configured to send inbound unicast packets to hardware receive rings based on the destination IP addresses of those unicast packets (ST210). That is, the hardware classifier is configured to send an inbound unicast packet to the hardware receive ring bound to the VNIC associated with the destination IP address of the unicast packet. The hardware classifier is also configured to send inbound multi-recipient packets, i.e., broadcast and multicast packets, to a default hardware receive ring (ST212).

A software receive ring is created for each VNIC (ST214) and each VNIC is bound a software receive ring (ST216). In one or more embodiments of the invention, the software ring is configured to classify inbound multi-recipient packets in the default hardware receive ring using the destination IP addresses of the packets and send these inbound multi-recipient packets to the software receive rings based on the classification (ST218). In one embodiment of the invention, configuring the software ring includes programming an inbound classifier to determine whether an inbound multi-recipient packet is a broadcast packet or a multicast packet. The inbound classifier is programmed to place a copy of the multi-recipient packet in each software receive ring if the multi-recipient packet is a broadcast packet. The inbound classifier is further programmed to place a copy of the multi-recipient packet in a software receive ring if the multi-recipient packet is a multicast packet and the VNIC bound to the software receive ring is associated with an IP address that is a member of the addressed multicast group.

The software ring is also configured to classify outbound packets as the outbound packets leave the VNICs, using the destination IP addresses of the packets, and to send these outbound packets to the software receive rings based on the classification (ST220). The software ring is further configured to send each outbound packet to a hardware transmit ring. In one embodiment of the invention, configuring the software ring includes programming an outbound classifier to analyze the outbound packets to determine whether any of the outbound packets are multi-recipient packets that should be transmitted to IP addresses on the host as well as on the network. The outbound classifier (118) is programmed to determine whether a multi-recipient packet is a broadcast packet or a multicast packet. The outbound classifier is programmed to place a copy of the outbound packet in each software receive ring if the outbound packet is a broadcast packet. The outbound classifier is further programmed to place a copy of the outbound packet in a software receive ring if the outbound packet is a multicast packet and the VNIC bound to the software receive ring is associated with an IP address that is a member of the addressed multicast group.

Figure 3:
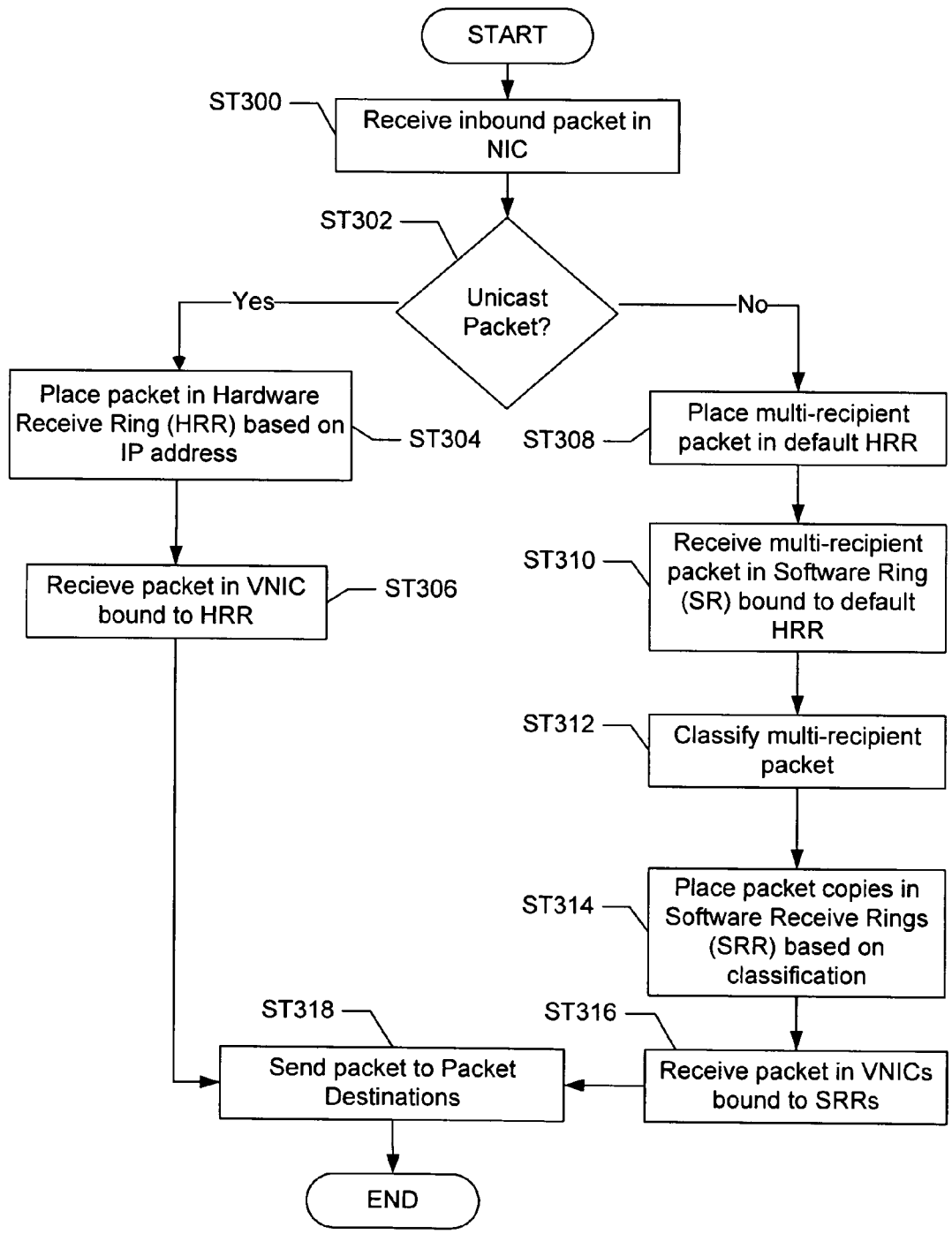

FIG. 3 shows a flowchart of the flow of inbound packets in the system of FIG. 1 in accordance with one or more embodiments of the invention. While the various steps in this flowchart are presented and described sequentially, one of ordinary skill will appreciate that some or all of the steps may be executed in different order and some or all of the steps may be executed in parallel. As shown in FIG. 3, an inbound packet is received in a hardware classifier of a NIC (ST300). The hardware classifier analyzes the inbound packet and sends to a hardware receive ring of the NIC based on this analysis. If the inbound packet is a unicast packet (ST302), then the inbound packet is placed in a hardware receive ring based on the destination IP address of the packet (ST304). That is, the inbound packet is placed in the hardware receive ring bound to the VNIC associated with the destination IP address of the packet. The inbound packet is received in the VNIC bound to the hardware receive ring (ST306) and sent from the VNIC to the packet destination addressed by the packet (ST318).

If the inbound packet is not a unicast packet (ST302), then the inbound packet is a multi-recipient packet. The multi-recipient packet is placed in the default hardware receive ring (ST308). A software ring bound to the default hardware receive ring receives the multi-recipient packet (ST310), classifies the multi-recipient packet (ST312), and places copies of the multi-recipient packet in one or more software receive rings based on the classification (ST314). The packets placed in the software receive rings are then received in the VNICs associated with the software receive rings (ST316) and sent from the VNICs to the packet destinations (ST318).

Figure 4:
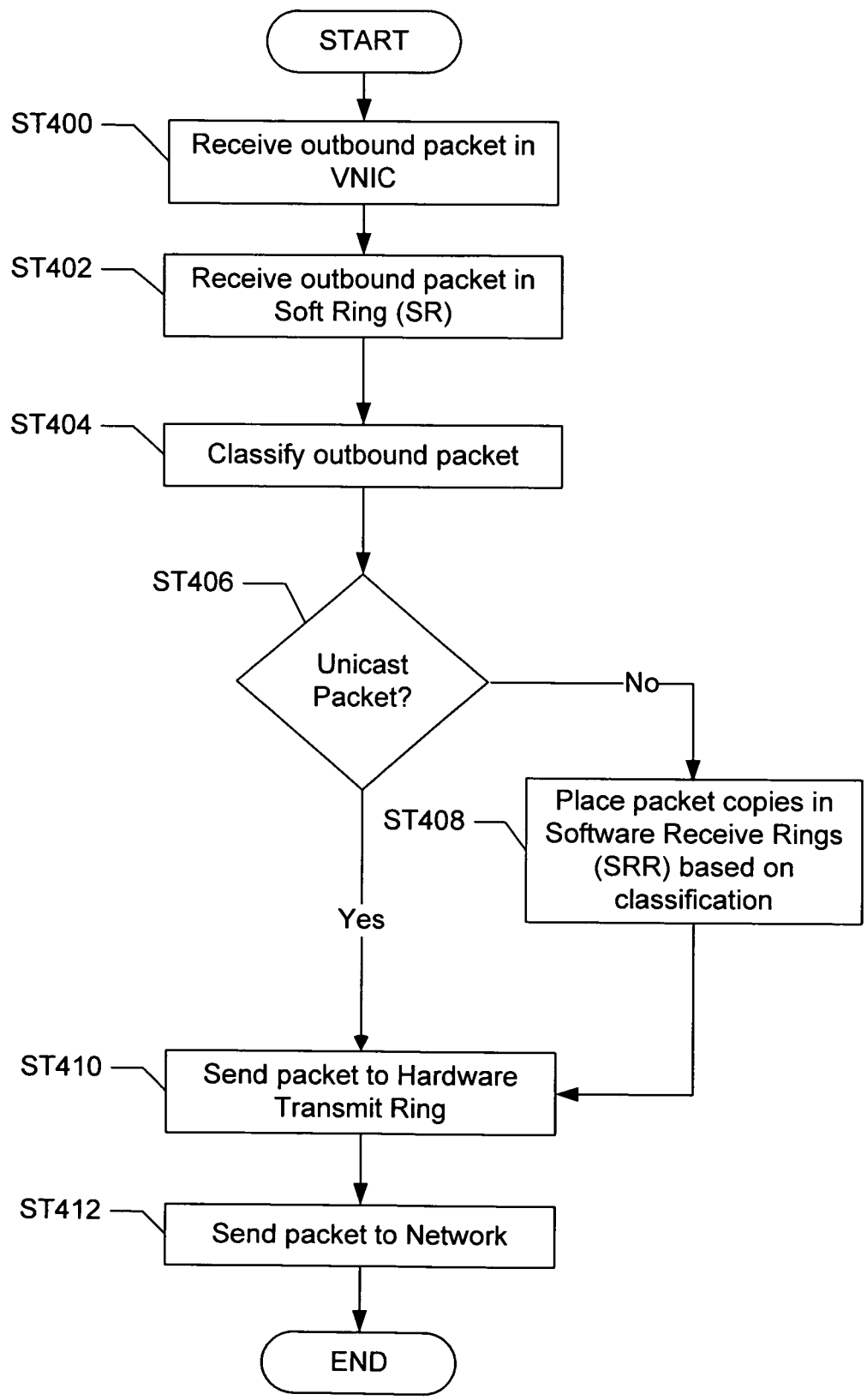

FIG. 4 shows a flowchart of the flow of outbound packets in the system of FIG. 1 in accordance with one or more embodiments of the invention. While the various steps in this flowchart are presented and described sequentially, one of ordinary skill will appreciate that the steps may be executed in different order and some or all of the steps may be executed in parallel. As shown in FIG. 4, an outbound packet is received in a VNIC (ST400). When the outbound packet leaves the VNIC, the outbound packet is received in a software ring (ST402) where the outbound packet is classified using the destination IP address of the packet to determine whether the packet should be transmitted to IP addresses on the host as well as to the network (ST404). Said another way, the outbound packet is classified to determine whether it is multi-recipient packet.

If the classification determines that the outbound packet is a unicast packet (ST406), then the packet is sent to the hardware transmit ring on the NIC (ST410) and ultimately sent to the network (ST412). If the classification determines that the outbound packet is a multi-recipient packet, then copies of the multi-recipient packet are placed in software receive rings based on the classification (ST408). The multi-recipient packet is also sent, as necessary, to the hardware transmit ring (ST410) and ultimately sent to the network (ST412).

Figure 5:
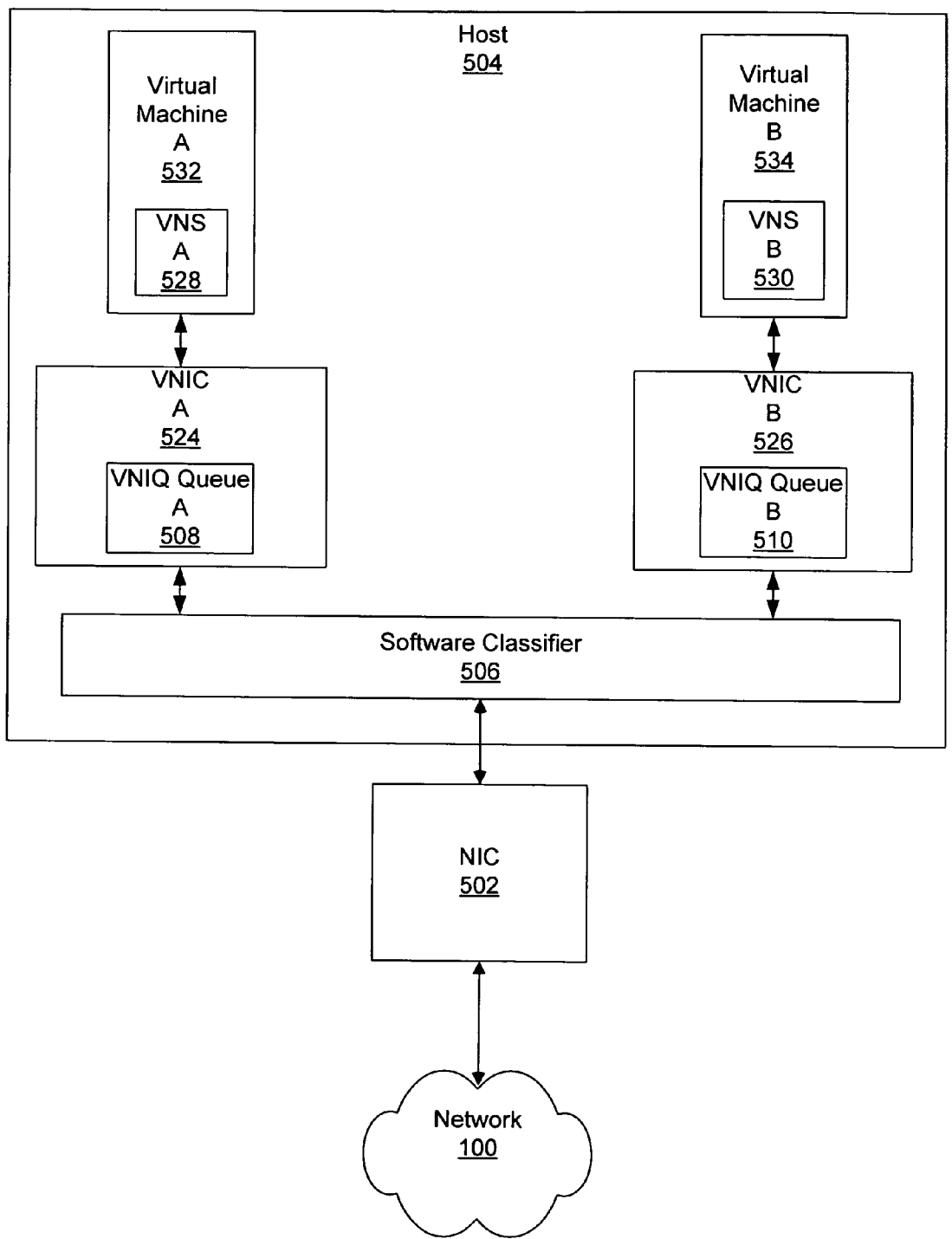
Figure 6:
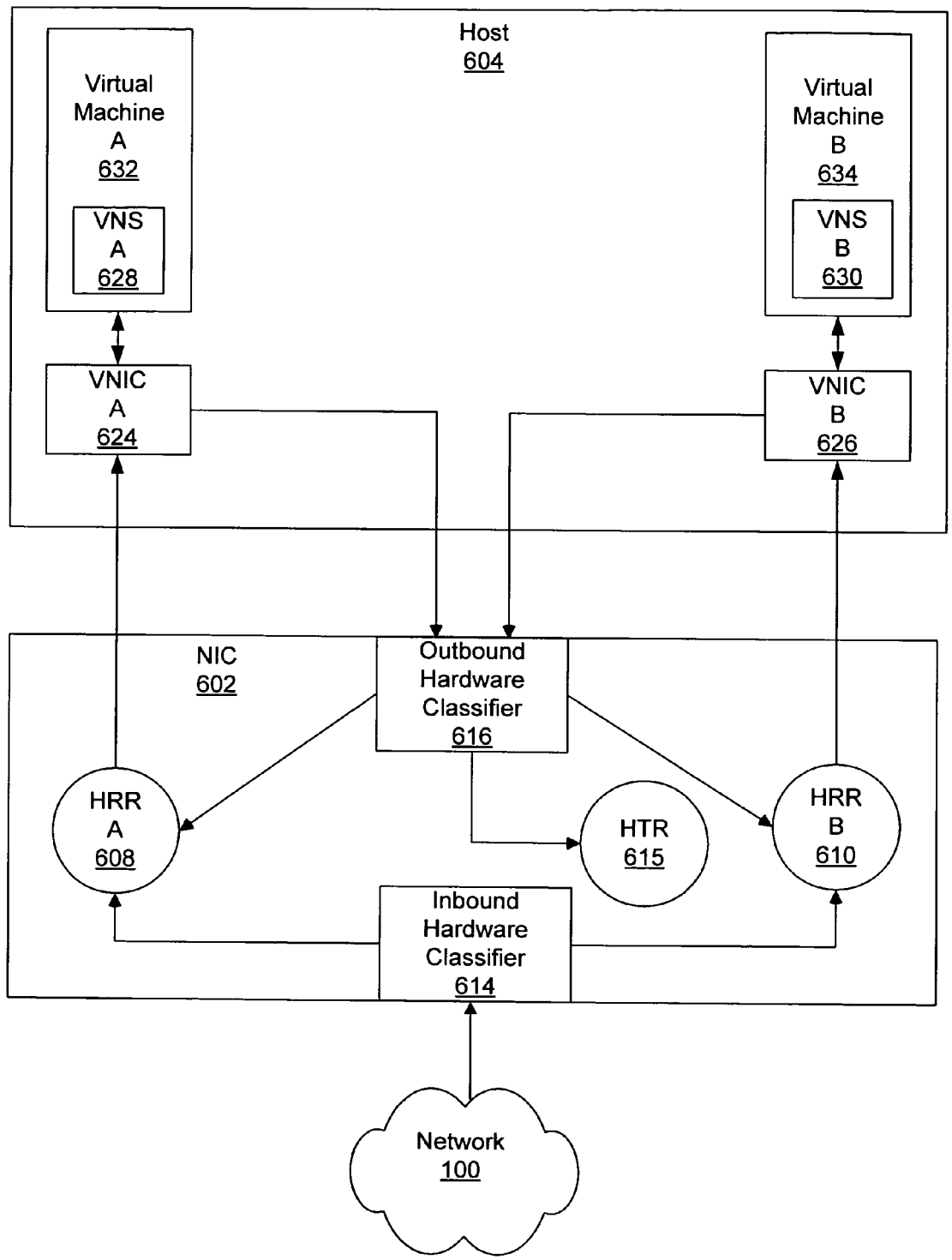

In the embodiments discussed above, classification of inbound and outbound packets is described as being performed both on the host and on the physical NIC. The described split of functionality between a hardware classifier and a software classifier (e.g., a software ring including inbound and outbound classifiers) is intended to be illustrative. One of ordinary skill will appreciate that all of the classification maybe done on the NIC or on the host. FIGS. 5 and 6, discussed below, respectively show embodiments of a system with all classification done at the NIC level and a system with all classifications done on the host. One of ordinary skill will also appreciate that the classification functionality may be split in different ways between the NIC and the host. For example, classification of inbound multi-recipient packets may be performed on the host and classification of outbound multi-recipient packets may be performed on the NIC.

FIG. 5 shows a system in accordance with one embodiment of the invention. The system includes a host (504) operatively connected to a NIC (502). The NIC (502) provides an interface between the host (504) and a network (500) (e.g., a local area network, a wide area network, a wireless network, etc.). More specifically, the NIC (502) includes a NI (i.e., the hardware on the NIC used to interface with the network) (not shown) that receives packets from the network (100) and transmits packets from the host (504) to the network (100). The NI may correspond to an RJ-45 connector, a wireless antenna, etc. The packets received by the NI from the network (100) are sent to other components on the NIC (502) for processing.

In one embodiment of the invention, the host (504) may include the following components: a device driver (not shown), a software classifier (506), one or more VNICs (524, 526), and one or more virtual machines (532, 534) including one or more virtual network stacks (528, 530). In one embodiment of the invention, the device driver (not shown) provides an interface between the NIC (502) and the software classifier (506) on the host (504). The functionality of the virtual machines (532, 534) and virtual network stacks (528, 530) is similar to that of the virtual machines (132, 134) and the virtual network stacks (128, 130) described above.

In one embodiment of the invention, the software classifier (506) is operatively connected to the NIC (502) and to the VNIC queues (508, 510) of the VNICs (524, 526). The software classifier (506) includes functionality to analyze both packets received from the network (100) and packets to be transmitted on the network (100) to determine whether those packets should be received by one or more packet destinations on the host (504). The software classifier (506) includes a transmit data queue (not shown) configured to temporarily store outbound packets in memory. In one or more embodiments of the invention, the transmit data queue (not shown) is allocated in host memory and may be implemented as a linked list, an array, or any other suitable data structure. In one embodiment of the invention, the driver (not shown) reads the outbound packets from the transmit data queue (not shown) and passes the packets to the NIC for transmission on the network (100).

In one embodiment of the invention, the software classifier (506) is configured to analyze the incoming network traffic, typically in the form of packets, received from the network (100) via the NIC (502). Analyzing individual packets includes using the destination IP addresses of the packets to determine to which of the VNIC queues (508, 510) each packet is sent. The software classifier (506) is configured to send a unicast packet to the VNIC queue (508, 510) of the VNIC (524, 526) associated with the IP address of the unicast packet. The software classifier (506) is further configured to determine whether an inbound multi-recipient packet is a broadcast packet or a multicast packet. If the multi-recipient packet is a broadcast packet, then the software classifier (506) is configured to place a copy of the broadcast packet in each VNIC queue (508, 510). If the multi-recipient packet is a multicast packet, then the software classifier (506) is configured to place a copy of the multicast packet in each VNIC queue (508, 510) associated with a VNIC (524, 526), which is associated with an IP address that is a member of the addressed multicast group.

In one embodiment of the invention, the software classifier (506) is configured to analyze outbound packets as these outbound packets leave the VNICs (524, 526) to determine whether any of the outbound packets are multi-recipient packets that should be transmitted to IP addresses on the host 504. The software classifier (506) is configured to determine whether an outbound packet is a unicast packet or a multi-recipient packet using the destination IP address of the packet. If the outbound packet is a unicast packet, then the software classifier (506) is configured to place the packet in the transmit data queue (not shown). If outbound packet is a multi-recipient packet, then the software classifier (506) is configured to determine whether the multi-recipient packet is a broadcast packet or a multicast packet. If the outbound packet is a broadcast packet, then the software classifier (506) is configured to place a copy of the broadcast packet in each VNIC queue (508, 510). If the outbound packet is a multicast packet, then the software classifier (506) is configured to place a copy of the multicast packet in each VNIC queue (508, 510), which is associated with a VNIC (524, 526) associated with an IP address that is a member of the addressed multicast group. The software classifier (506) is further configured to place the multi-recipient packets in the transmit data queue (not shown).

In one embodiment of the invention, the VNICs (524, 526) provide an abstraction layer between the NIC (102) and the various packet destinations (not shown) executing on the virtual machines (532, 534) of the host (504). More specifically, each VNIC (524, 526) operates like a NIC (502). Thus, while the host (504) may be operatively connected to a single NIC (502), the virtual machines (532, 534) of the host (504) operate as if the host (504) is bound to multiple NICs. In one embodiment of the invention, each VNIC (524, 526) includes a VNIC queue (508, 510). In one embodiment of the invention, the VNIC queues (508, 510) correspond to portions of memory (e.g., buffers) within the host (504) used to temporarily store inbound packets.

In one embodiment of the invention, each of the VNICs (524, 526) is associated with a virtual machine (532, 534) including one or more virtual network stacks (528, 530). Each of the VNICs (524, 526) is associated with a unique IP address of the virtual machine (528, 530) to which the VNIC (524, 526) is operatively connected. That is, a VNIC (524, 526) is created for each IP address of a virtual machine (532, 534). All received packets having an IP address of the virtual machine as well as broadcast packets or multicast packets directed to a multicast group including the IP address pass through the VNIC (524, 526) associated with that IP address. In addition, all outbound packets from that IP address pass through the VNIC (524, 526) associated with that IP address.

FIG. 6 shows a system in accordance with one embodiment of the invention. The system includes a host (604) operatively connected to a NIC (602). The NIC (602) provides an interface between the host (604) and a network (100) (e.g., a local area network, a wide area network, a wireless network, etc.). More specifically, the NIC (602) includes a network interface (NI) (i.e., the hardware on the NIC used to interface with the network) (not shown) that receives packets from the network (600) and transmits packets from the host (604) to the network (100). The NI may correspond to an RJ-45 connector, a wireless antenna, etc. The packets received by the NI from the network (100) are sent to other components on the NIC (602) for processing.

In one embodiment of the invention, the NIC (502) includes an inbound hardware classifier (614), an outbound hardware classifier (616), one or more hardware receive rings (608, 610), and a hardware transmit ring (615). In one embodiment of the invention, the hardware receive rings (608, 610) and the hardware transmit ring (615) correspond to portions of memory within the NIC (602) used to temporarily store received packets and packets to be transmitted. In one embodiment of the invention, the hardware receive rings (608, 610) are each operatively connected to a VNIC (624, 626) associated with a unique internet protocol (IP) address.

In one embodiment of the invention, the inbound hardware classifier (614) is configured to analyze the incoming network traffic, typically in the form of packets, received from the network (100). The outbound hardware classifier (616) is configured to analyze outbound packets received from the VNICs (624, 626). The hardware classifiers (614, 616) may be implemented entirely in hardware (i.e., the hardware classifiers (614, 616) may be separate microprocessors embedded on the NIC (602)). Alternatively, the hardware classifiers (614, 616) may be implemented in software stored in memory (e.g., firmware, etc.) on the NIC and executed by a microprocessor on the NIC (602).

In one embodiment of the invention, the inbound hardware classifier (614) is configured to analyze inbound packets by using the IP addresses of the packets to determine to which of the hardware receive rings (608, 610) each packet is sent. The inbound hardware classifier (614) is configured to send a unicast packet to the hardware receive ring (608, 610) of the VNIC (524, 526) associated with the IP address of the unicast packet. The inbound hardware classifier (614) is further configured to determine whether an inbound multi-recipient packet is a broadcast packet or a multicast packet. If the multi-recipient packet is a broadcast packet, then the inbound hardware classifier (614) is configured to place a copy of the broadcast packet in each hardware receive ring (608, 610). If the multi-recipient packet is a multicast packet, then the inbound hardware classifier (614) is configured to place a copy of the multicast packet in each hardware receive ring (608, 610) associated with a VNIC (624, 626) associated with an IP address that is a member of the addressed multicast group.

The outbound hardware classifier (616) is configured to analyze outbound packets as these outbound packets leave the VNICs (624, 626) to determine whether any of the outbound packets are multi-recipient packets that should be transmitted to IP addresses on the host (604). The outbound hardware classifier (616) is configured to determine whether an outbound packet is a unicast packet or a multi-recipient packet. If the outbound packet is a unicast packet, then the outbound hardware classifier (616) is configured to send the packet to the hardware transmit ring (615). If outbound packet is a multi-recipient packet, then the outbound hardware classifier (616) is configured to determine whether the multi-recipient packet is a broadcast packet or a multicast packet. If the outbound packet is a broadcast packet, then the outbound hardware classifier (616) is configured to place a copy of the broadcast packet in each hardware receive ring (608, 610). If the outbound packet is a multicast packet, then the outbound hardware classifier (616) is configured to place a copy of the multicast packet in each hardware receive ring (608, 610) associated with a VNIC (624, 626) associated with an IP address that is a member of the addressed multicast group. The outbound hardware classifier (616) is further configured to send the multi-recipient packets to the hardware transmit ring (615).

In one embodiment of the invention, the host (604) may include the following components: a device driver (not shown), one or more VNICs (624, 626), and one or more virtual machines (632, 634) including one or more virtual network stacks (628, 630). In one embodiment of the invention, the device driver (not shown) provides an interface between the hardware receive rings (608, 610) and the host (604). More specifically, the device driver (not shown) exposes the hardware receive rings (608, 610) to the host (604). The functionality of the virtual machines (632, 634) and virtual network stacks (628, 630) is similar to that of the virtual machines (632, 634) and the virtual network stacks (628, 630) described above.

In one embodiment of the invention, the VNICs (624, 626) provide an abstraction layer between the NIC (602) and the various packet destinations (not shown) executing on the virtual machines (632, 634) of the host (604). More specifically, each VNIC (624, 626) operates like a NIC (602). Thus, while the host (604) may be operatively connected to a single NIC (602), the virtual machines (632, 634) of the host (604) operate as if the host (604) is bound to multiple NICs.

In one embodiment of the invention, each of the VNICs (624, 626) is associated with a virtual machine (632, 634) including one or more virtual network stacks (628, 630). Each of the VNICs (624, 626) is associated with a unique IP address of the virtual machine (628, 630) to which the VNIC (624, 626) is operatively connected. That is, a VNIC (624, 626) is created for each IP address of a virtual machine (632, 634). All received packets having an IP address of the virtual machine as well as broadcast packets or multicast packets directed to a multicast group including the IP address pass through the VNIC (624, 626) associated with that IP address. In addition, all outbound packets from that IP address pass through the VNIC (624, 626) associated with that IP address.

Figure 7:
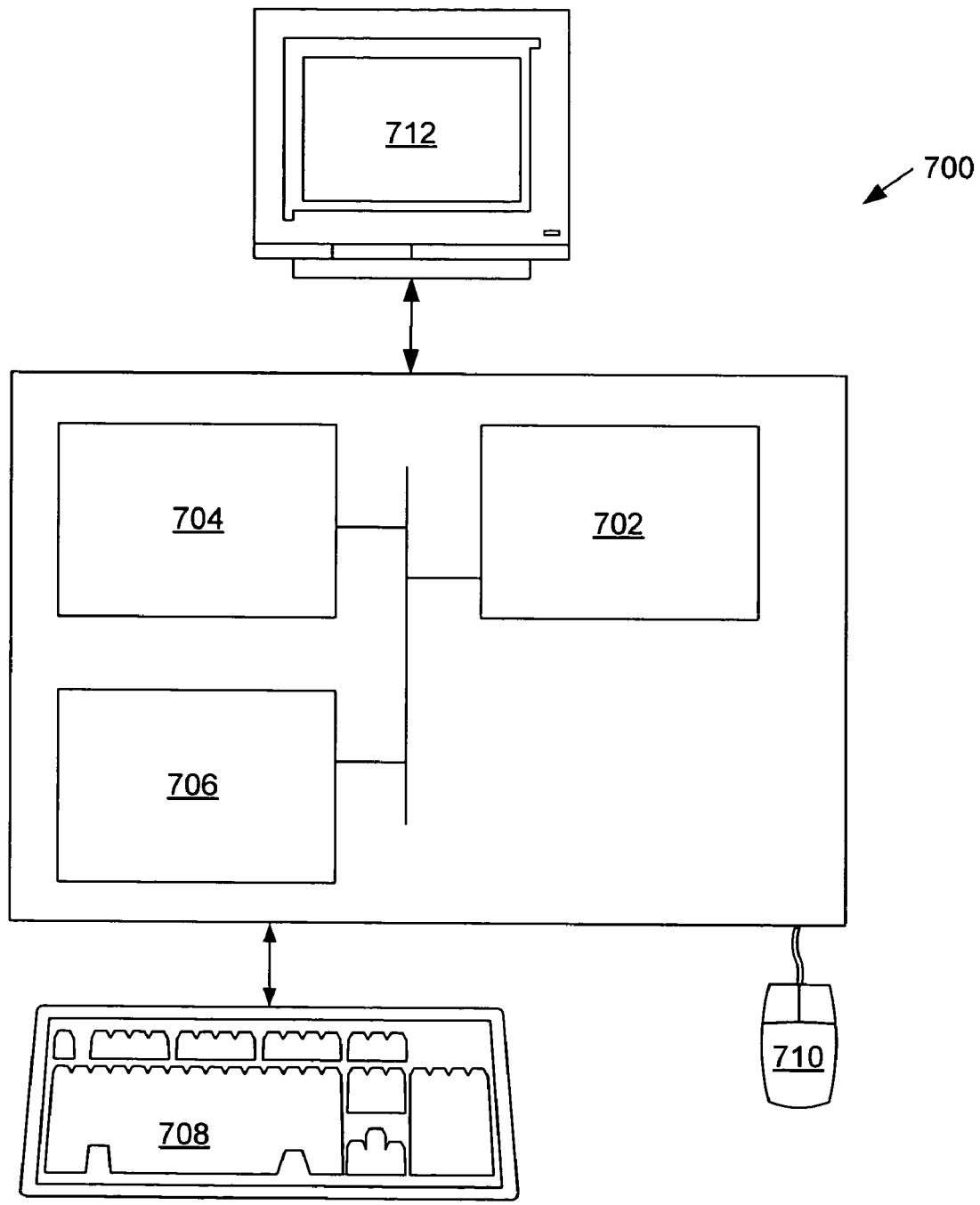
FIG. 7 shows a computer system in accordance with one or more embodiments of the invention.

Embodiments of the invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., network interface card, virtual network interface card, software ring, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
a network interface card (NIC) associated with a Media Access Control (MAC) address, comprising:
a default hardware receive ring (HRR),
a plurality of non-default HRRs, and
a hardware classifier configured to:
analyze an inbound packet received by the NIC using a destination Internet Protocol (IP) address of the inbound packet,
determine, based on the analysis of the destination IP address of the inbound packet, whether the inbound packet is a unicast packet or a multi-recipient packet,
send the inbound packet to one of the plurality of non-default HRRs if the inbound packet is a unicast packet, and send the packet to the default HRR if the inbound packet is an inbound multi-recipient packet, and a host, operatively connected to the NIC, comprising:
- a plurality of virtual NICs (VNICs), wherein each of the plurality of VNICs is associated with a unique IP address and the MAC address and wherein each of the plurality of VNICs is associated with one of the plurality of non-default HRRs, and
- an inbound software classifier comprising a plurality of software receive rings (SRRs), wherein each of the plurality of SRRs is associated with one of the plurality of VNICs,
- wherein the inbound software classifier is configured to:
  obtain inbound packets from the default HRR, and
  determine to which of the plurality of SRRs to send a copy of the packet.

2. The system of claim 1, wherein the host further comprises:
- an outbound software classifier configured to:
  receive an outbound packet,
  determine, based on the analysis of a destination IP address of the outbound packet, whether the outbound packet is a unicast packet or an outbound multi-recipient packet,
  send the outbound packet to a hardware transmit ring if the outbound packet is a unicast packet.

3. The system of claim 2, wherein the outbound multi-recipient packet is one selected from a group consisting of a broadcast packet and a multicast packet.

4. The system of claim 3, wherein the outbound software classifier is further configured to:
- if the outbound packet is the broadcast packet:
  send a copy of the outbound packet to each of the plurality of VNICs; and
  send the outbound packet to the hardware transmit ring.

5. The system of claim 3, wherein the outbound software classifier is further configured to:
- if the outbound packet is the multicast packet:
  determine which of the plurality of VNICs is associated with a multicast group associated with the multicast packet;
  send a copy of the outbound packet to each of the plurality of VNICs associated with the multicast group; and
  send the outbound packet to the hardware transmit ring.

6. The system of claim 1, wherein the one of the plurality of non-default HRRs is associated with the one of the plurality VNICs and wherein the one of the plurality of VNICs is associated with an IP address corresponding to the destination IP address.

7. The system of claim 1, wherein the multi-recipient packet corresponds to a broadcast packet.

8. The system of claim 1, wherein the multi-recipient packet corresponds to a multicast packet.

9. A method for processing packets, comprising:
receiving an inbound packet at a physical network interface card (NIC) associated with a Media Access Control (MAC) address, wherein the physical NIC comprises a default hardware receive ring (HRR), a plurality of non-default HRRs, and a hardware classifier;

analyzing, by the hardware classifier, the inbound packet using a destination Internet Protocol (IP) address of the inbound packet;

determining, by the hardware classifier and based on the analysis of the destination IP address of the inbound packet, whether the inbound packet is a unicast packet or a multi-recipient packet;

sending, by the hardware classifier, the inbound packet to one of the plurality of non-default HRRs if the inbound packet is a unicast packet, wherein the one of the plurality of non-default HRRs is associated with one of a plurality VNICs located on a host operatively connected to the physical NIC, and wherein the one of the plurality of VNICs is associated with an IP address corresponding to the destination IP address;

sending, by the hardware classifier, the packet to the default HRR if the inbound packet is a multi-recipient packet, wherein each of the plurality of VNICs is associated with a unique IP address and a common Media Access Control (MAC) address, wherein the host comprises an inbound software classifier, wherein the inbound software classifier comprises a plurality of software receive rings (SRRs), wherein each of the plurality of SRRs is associated with one of the plurality of VNICs, wherein the inbound software classifier is configured to:
obtain inbound packets from the default HRR, and
determine to which of the plurality of SRRs to send a copy of the packet.

10. The method of claim 9, further comprising:
receiving an outbound packet,
analyzing the outbound packet using a destination Internet Protocol (IP) address of the outbound packet,
determining, based on the analysis of the destination IP address of the outbound packet, whether the outbound packet is a unicast packet or a multi-recipient packet, and
sending the outbound packet to a transmit receive ring if the outbound packet is a unicast packet.

11. The method of claim 10, further comprising:
if the outbound packet is a broadcast packet:
sending a copy of the outbound packet to each of the plurality of RRs.

12. The method of claim 10, further comprising:
if the outbound packet is the multicast packet:
determining which of the plurality of VNICs is associated with a multicast group, which is associated with the multicast packet; and
sending a copy of the outbound packet to each of the plurality of RRs, wherein each of the plurality of RRs is associated with one of the plurality of VNICs, which is associated with the multicast group.

* * * * *